T. E. CORBETT.
FRUIT PRESSING DEVICE.
APPLICATION FILED APR. 17, 1912.
1,034,207.
Patented July 30, 1912.
2 SHEETS—SHEET 2.
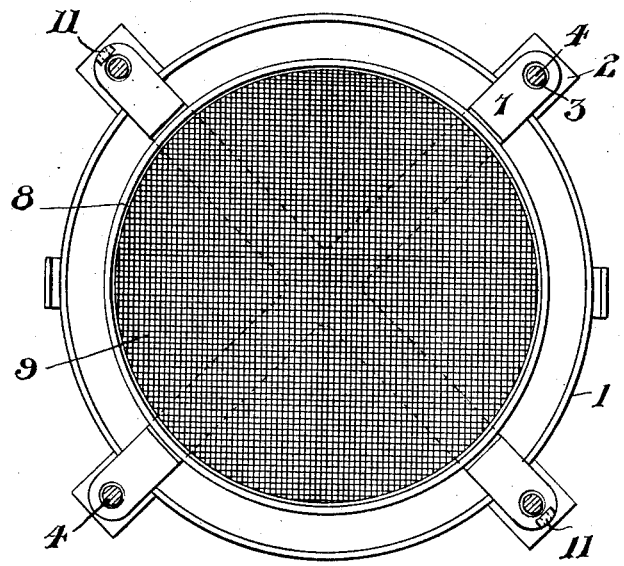
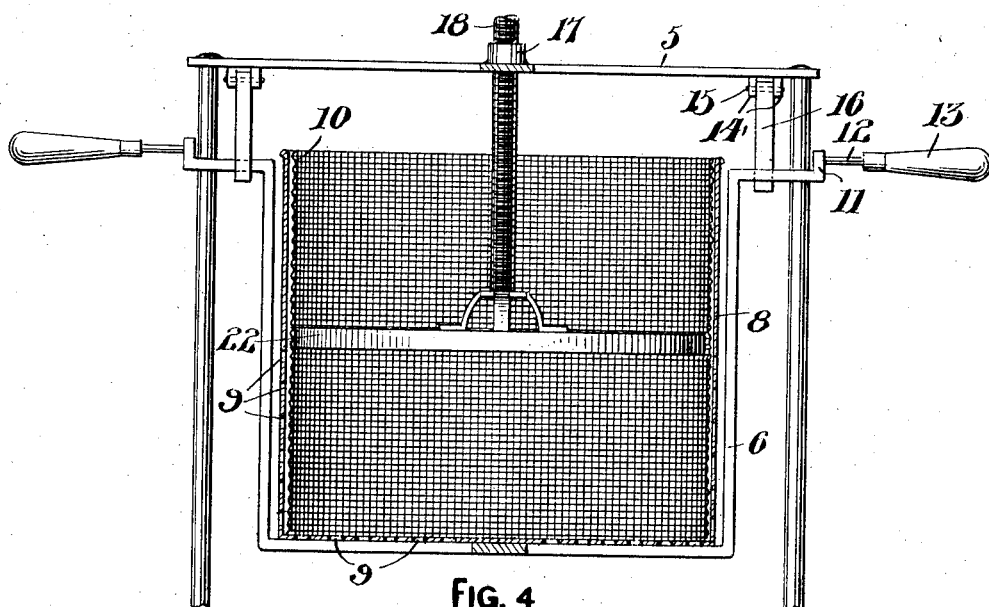
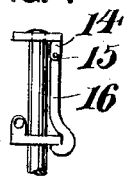
WITNESSES
INVENTOR
Thomas E. Corbett
BY
ATTORNEYS

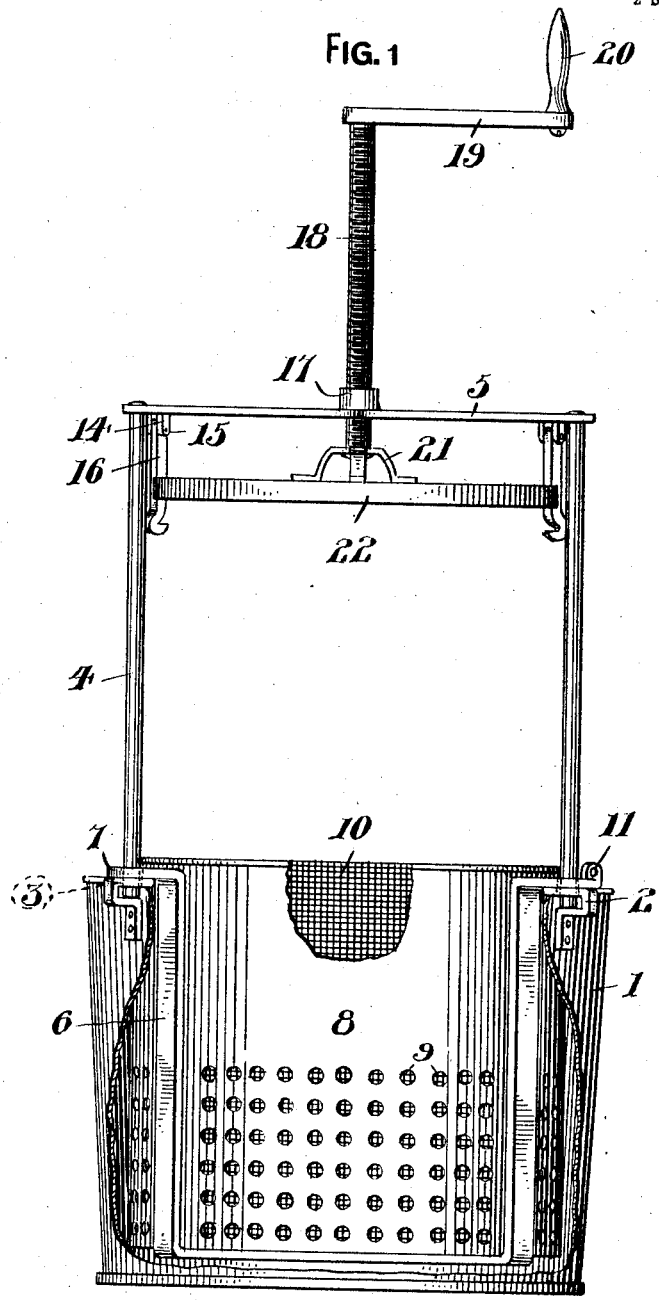

UNITED STATES PATENT OFFICE.

THOMAS E. CORBETT, OF PITTSBURGH, PENNSYLVANIA.

FRUIT-PRESSING DEVICE.

1,034,207. Specification of Letters Patent. Patented July 30, 1912.

Application filed April 17, 1912. Serial No. 691,423.

*To all whom it may concern:*

Be it known that I, THOMAS E. CORBETT, a citizen of the United States of America, residing at Pittsburgh, in the county of Allegheny and State of Pennsylvania, have invented certain new and useful Improvements in Fruit-Pressing Devices, of which the following is a specification, reference being had therein to the accompanying drawing.

This invention relates to a fruit press, and the primary object of my invention is to provide a fruit pressing device that will facilitate the making of preserves.

Another object of this invention is to provide a fruit pressing device into which food can be placed, prepared and then easily and quickly cut, whereby the syrup or juices of the fruit will be extracted.

A further object of this invention is to provide a receptacle with a foraminous body that can be elevated, whereby the contents thereof can be pressed and the extracted syrup or juice returned to the receptacle.

A still further object of this invention is to provide a culinary utensil with a pressing attachment that is inexpensive to manufacture, durable, easy to manipulate and highly efficient for the purposes for which it is intended.

With the above and other objects in view, the invention resides in the novel construction, combination and arrangement of parts to be hereinafter specifically described and then claimed.

Reference will now be had to the drawing, wherein:—

Figure 1 is a side elevation of the fruit pressing device partly broken away and partly in section, Fig. 2 is a horizontal sectional view of the same, Fig. 3 is a side elevation of a portion of the device illustrating the foraminous body in an elevated position with the pressing head therein, and Fig. 4 is a front elevation of a lock employed in connection with the fruit pressing device.

The reference numeral 1 denotes an ordinary receptacle and secured to the outer side of said receptacle, at the upper edges thereof, are four equally spaced brackets 2 that have the horizontal top portions thereof provided with openings 3. Extending through the openings 3 and resting upon the brackets 2 are the lower ends of uprights 4, said uprights having the upper ends thereof connected by a spider 5. Movably mounted upon the uprights 4 is a frame, comprising L-shaped arms 6 that have the lower ends thereof formed integral and the upper ends provided with lateral apertured lugs 7 through which the uprights 4 extend. The arms 6 are equally spaced and form a support for a foraminous receptacle 8, the receptacle having the bottom and walls thereof perforated, as at 9. Arranged within the foraminous receptacle 8 is a cylindrical screen 10, preferably made of fine interwoven wire. Two of the oppositely disposed lugs 7 have holders 11 in which the ends 12 of handles 13 can be placed when it is desired to elevate the frame supporting the foraminous receptacle 8.

To retain the supporting frame in an elevated position, as illustrated in Fig. 3, the spider 5 is provided with hangers 14 and pivotally connected to said hangers, as at 15 are hook-shaped locks 16 adapted to engage under the lugs 7 and support the frame and the foraminous receptacle thereof in an elevated position, while fruit within the foraminous receptacle is crushed or otherwise operated upon. The spider 5 is provided with a central boss 17 and adjustably mounted in said boss is a vertical screw 18. The upper end of the screw 18 has a crank 19 provided with a handle 20, and the lower end of said screw is revolubly connected to a bearing 21, carried by a circular presser head 22.

The manner of using the fruit pressing device depends considerably upon the fruit to be pressed, also the preserves, wine or other matter being prepared. Assuming, however, that the pressing device has been placed in position upon the receptacle 1 and that the foraminous receptacle is in a lowered position, as illustrated in Fig. 1, fruit can be placed within the foraminous receptacle. It is possible to place the receptacle 1 upon a stove or other heating medium, and to boil, stew or otherwise prepare the contents of the fruit within the foraminous body. It is preferable, however, to simply use the device as a press, and I will assume that the fruit to be pressed has been previously prepared. After having been placed in the foraminous receptacle 8, the fruit can be disintegrated by using any suitable instrument, for instance a potato masher. During such operation, a portion of the syrup is liberated and collects in the receptacle 1. The frame supporting the foraminous receptacle can then be elevated and held in an elevated position by the lock 16. By then rotating the screw 18, the head 22 is lowered into the foraminous receptacle, as illustrated in Fig. 3. Sufficient pressure is brought to bear upon the contents of the receptacle to extract the syrup and juice from the fruit, the extracted syrup or juice falling into the receptacle 1.

The wire screen 10 is employed for preventing seed, pulp and other matter from passing through the perforations of the receptacle 8, and in lieu of this screen, pieces of fine fabric can be used.

It is obvious that the fruit pressing device can be used for other purposes than making preserves, for instance, the screen 10 can be removed and apple sauce prepared by pressing the apples in the foraminous receptacle until the apples pass through the perforations 9 thereof.

The fruit pressing device in its entirety can be made of light and durable metal, and the manner in which the parts are assembled permits of said parts being thoroughly cleaned and maintained in a sanitary condition.

While in the drawing there is illustrated a preferred embodiment of the invention, it is to be understood that the structural elements are susceptible to such variations as fall within the scope of the appended claims.

What I claim is:—

1. A fruit pressing device comprising a receptacle, uprights detachably connected to the upper edges thereof, a spider connecting the upper ends of said uprights, a supporting frame movably arranged upon said uprights, a foraminous receptacle carried by said supporting frame, means carried by said spider for retaining said supporting frame in an elevated position above said receptacle, and a presser head operatable from said spider for pressing the contents within said foraminous receptacle.

2. In a fruit pressing device, the combination with a receptacle, of uprights having the lower ends thereof detachably connected to the upper edges of said receptacle, a spider connecting the upper ends of said uprights, a supporting frame movably mounted upon said uprights, a foraminous receptacle carried by said frame, a screen arranged within said foraminous receptacle, hooks carried by said spider for retaining said supporting frame in an elevated position above the first mentioned receptacle, and a presser head operatable from said spider for pressing the contents of said foraminous receptacle.

3. In a fruit pressing device, the combination with a receptacle, of uprights having the lower ends thereof detachably connected to the upper edges of said receptacle, a spider connecting the upper ends of said uprights, a supporting frame movably mounted upon said uprights, a foraminous receptacle carried by said frame, a screen arranged within said foraminous receptacle, hooks carried by said spider for retaining said supporting frame in an elevated position above the first mentioned receptacle, a presser head operatable from said spider for pressing the contents of said foraminous receptacle, and handles adapted to be detachably connected to said supporting frame to facilitate elevating said frame.

In testimony whereof I affix my signature in the presence of two witnesses.

THOMAS E. CORBETT.

Witnesses:
Max H. Srolovitz,
K. H. Butler.

Copies of this patent may be obtained for five cents each, by addressing the "Commissioner of Patents, Washington, D. C."